UNITED STATES PATENT OFFICE.

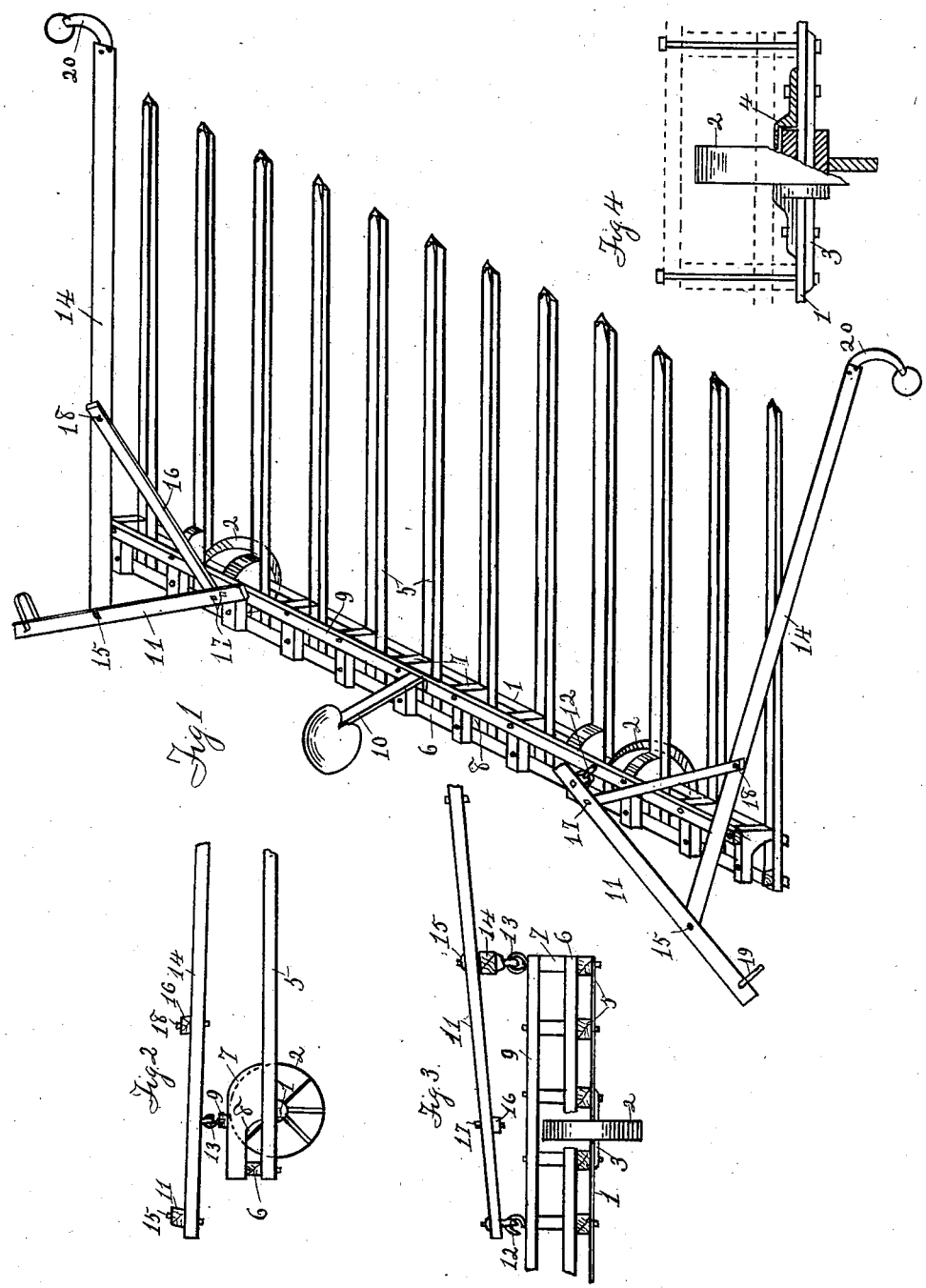

WINFIELD S. LIVENGOOD, OF KANSAS CITY, MISSOURI, ASSIGNOR TO THE SMITH & SONS MANUFACTURING COMPANY, OF KANSAS CITY, MISSOURI, A CORPORATION OF MISSOURI.

HAY-RAKE.

SPECIFICATION forming part of Letters Patent No. 694,558, dated March 4, 1902.

Application filed July 1, 1901. Serial No. 66,764. (No model.)

*To all whom it may concern:*

Be it known that I, WINFIELD S. LIVENGOOD, a citizen of the United States, residing at Kansas City, in the county of Jackson, in the State of Missouri, have invented certain new and useful Improvements in Hay-Rakes, of which the following is a full, clear, and exact description, reference being had to the accompanying drawings, which form a part of this specification.

My invention relates to improvements in hay-rakes, having more particular relation to improvements in the devices and in the arrangement of devices for securing the draft-poles to the frame of the rake; and my invention consists in certain features of novelty hereinafter described, and pointed out in the claims.

Figure 1 represents an isometric view of a hay-rake embodying my invention. Fig. 2 represents a side elevation of the same. Fig. 3 represents a detail rear view of a portion of the frame of the rake, showing the manner of connecting the draft-bar to the frame and the manner of mounting the frame upon the carrying-wheels. Fig. 4 shows in detail the mounting of said wheels.

Similar numerals refer to similar parts throughout the several views.

1 represents a bar in length substantially the width of the rake and upon which at equal distance from the ends the wheels 2 are mounted and may hence be called the "axle-bar." Said bar is strengthened and enlarged, as shown at 3, to provide a journal for the wheels, which are boxed in and capped at the ends of the hub, as shown at 4 in Fig. 4, to prevent access of dust and grit to the bearing. Upon said axle-bar are mounted the rake-teeth 5, which extend rearwardly a distance sufficient to carry on their rear ends a tail-bar 6. Upon said teeth are mounted blocks 7, recessed, as shown at 8, and carried at their rear ends upon said tail-bar 6. Upon said blocks, substantially over the axle-bar, is mounted a cap-plate 9, upon which may be mounted a seat 10, the relation being such that the weight of the driver will substantially balance the weight of the rake-teeth, so that when the weight is thrown back on the seat the forward ends of the teeth will be elevated, and said blocks 7 being provided one upon each of the teeth and the cap-plate 9 secured thereon substantially over the axle, as stated, have the effect to prevent sagging of the frame between the wheels, such sagging, besides being objectionable in itself, tending to unduly elevate the rake-teeth beyond or outside of the wheels, so that the rake-teeth instead of lying in the same plane are forced into a curved line under the weight of the load and the effective operation of the rake seriously interfered with. Upon said cap-plate at suitable distance from its ends are flexibly connected by links 12 the inner ends of the draft-bars 11. Near the ends of said plate are flexibly mounted by links 13 the draft-poles 14, which are extended rearwardly and secured to said draft-bars at 15 intermediate their ends. A brace-bar 16 is connected with said draft-bar at 17 near its inner end and with said draft-pole at 18 forward of the connection of said pole upon the cap-plate. Said brace serves to stiffen the connection between said draft-bar and draft-pole and give rigidity to said pole against lateral strains, thus providing a very strong and efficient draft attachment. Upon the outer end of said draft-bar is provided a clevis 19 for the attachment of the usual whiffletree, (not shown,) and upon the forward end of the draft-pole is mounted a neck-yoke 20 for the attachment of a breast-strap upon the draft-animal. (Not shown.)

By the construction and arrangement herein described a very strong and durable frame is provided, cheap in construction and serviceable and efficient in operation, and by applying the draft attachments in the manner described the draft is equalized and a very light-running and easily-managed rake is produced.

Having thus fully described my improvements, what I claim as my invention, and desire to secure by Letters Patent, is—

1. In a hay-rake of the character described, the combination with the rake-frame of draft-bars flexibly connected with said frame at a distance from its ends, draft-poles flexibly connected with said frame near its ends, and secured to said draft-bars intermediate their ends, and brace-bars connected with said draft-bars near their inner ends and with said draft-poles in advance of the connecting-point of said poles upon the frame; substantially as set forth.

2. In a hay-rake of the character described, the combination with the rake-frame, of draft-bars, flexible connection between said draft-bars and said frame at a distance from its ends, draft-poles secured to said draft-bars intermediate their ends and extending a distance rearwardly with relation to the rake-frame, flexible connection between said poles and said frame near its ends and braces connected with said draft-bars near their inner ends and with said draft-poles in advance of the connecting-point thereof upon the rake-frame, and whereby rigidity of said poles against lateral strains is secured; substantially as set forth.

WINFIELD S. LIVENGOOD.

Witnesses:
WM. J. SMITH,
O. A. LUCAS.